Figure 1:
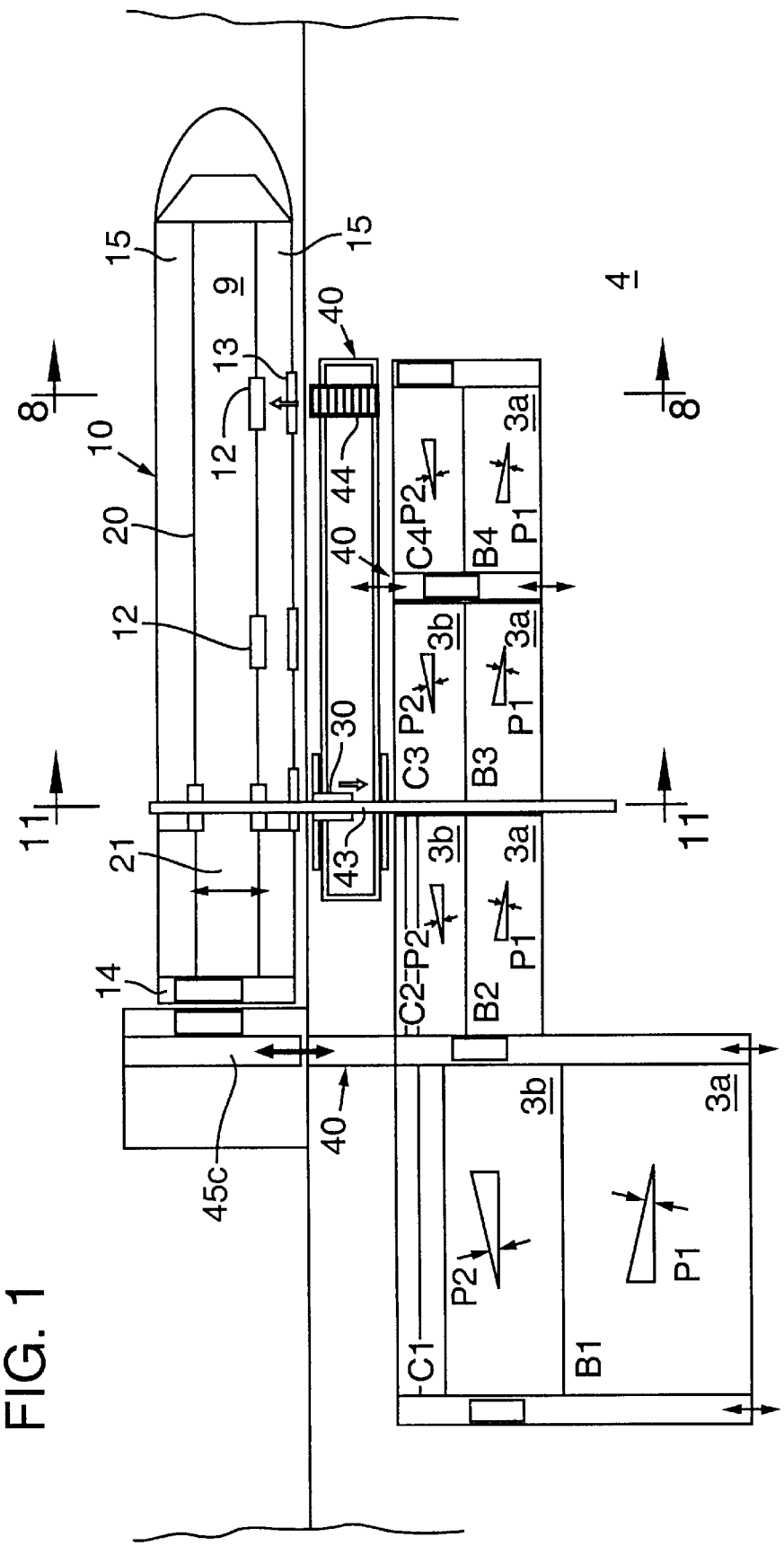

United States Patent
Rapeli et al.

[11] Patent Number: 5,882,164
[45] Date of Patent: Mar. 16, 1999

[54] PORT ARRANGEMENT

[76] Inventors: Pekka E. Rapeli, Martinlaaksontie 42 D 16, FIN-01620 Vantaa; Kari Väinämö Pietarinen, Poijutie 20 D, FIN-00980 Helsinki, both of Finland

[21] Appl. No.: 793,220

[22] PCT Filed: Aug. 16, 1995

[86] PCT No.: PCT/FI95/00432

§ 371 Date: Apr. 22, 1997

§ 102(e) Date: Apr. 22, 1997

[87] PCT Pub. No.: WO96/05131

PCT Pub. Date: Feb. 22, 1996

[30] Foreign Application Priority Data

Aug. 16, 1994 [FI] Finland .................................. 943763

[51] Int. Cl.⁶ .................................................. B63B 27/00
[52] U.S. Cl. ................................. 414/141.3; 414/139.4; 414/141.4
[58] Field of Search ............................. 414/139.4, 141.3, 414/141.4, 139.9, 140.3, 140.4

[56] References Cited

U.S. PATENT DOCUMENTS

| | | |
|---|---|---|
| 1,584,080 | 5/1926 | Dinkelberg . |
| 2,916,166 | 12/1959 | Bigler . |
| 2,970,705 | 2/1961 | De Witt, Jr. et al. . |
| 3,537,414 | 11/1970 | Goldman . |
| 4,106,640 | 8/1978 | Omote . |
| 4,878,796 | 11/1989 | Ammeraal . |
| 4,977,999 | 12/1990 | Smock . |
| 5,123,517 | 6/1992 | Windau . |

FOREIGN PATENT DOCUMENTS

| | | |
|---|---|---|
| 0340673A1 | 11/1989 | European Pat. Off. . |
| 0380711A1 | 8/1990 | European Pat. Off. . |
| 0528185A1 | 2/1993 | European Pat. Off. . |
| 1178733 | 9/1964 | Germany . |
| 1756073 | 3/1970 | Germany . |
| 2211452 | 11/1972 | Germany . |
| 61-105288 | 5/1986 | Japan . |
| 448712 | 9/1983 | Sweden . |
| 216671 | 5/1986 | United Kingdom . |
| WO94/01357 | 1/1994 | WIPO . |
| WO94/16937 | 8/1994 | WIPO . |

Primary Examiner—Karen M. Young
Assistant Examiner—Douglas Hess
Attorney, Agent, or Firm—Klarquist Sparkman Campbell Leigh & Whinston, LLP

[57] ABSTRACT

The present invention relates to a port arrangement for transferring first-type and second-type freight units from a storage area on shore into a freight space of a ship and vice versa. The ship comprises a first freight space compartment forming a structural part of the ship and including a plurality of superimposed freight planes. The ship's hull includes freight handling apertures. More specifically, the port arrangement is for handling simultaneously at least two types of freight to be shipped in different ways, the first freight type being wheeled vehicles and the second freight type being large general or bulk cargo. A lifting framework is used for loading and unloading the ship and includes a mechanism for reducing motion resistance in the loading planes to enable movement of the freight units mainly in a horizontal direction during such loading and unloading.

18 Claims, 11 Drawing Sheets

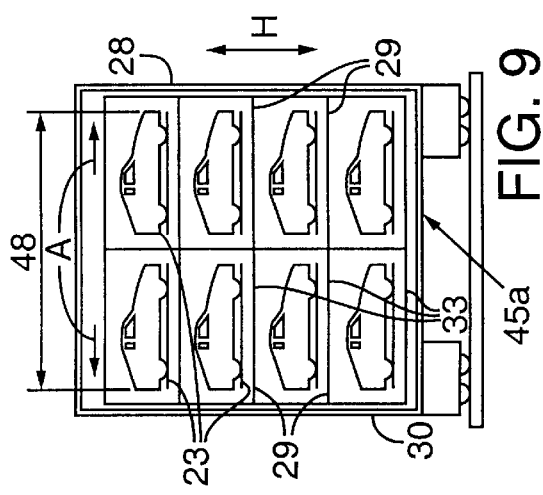
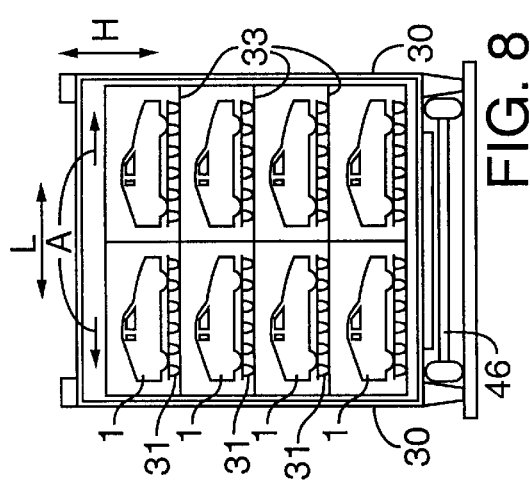
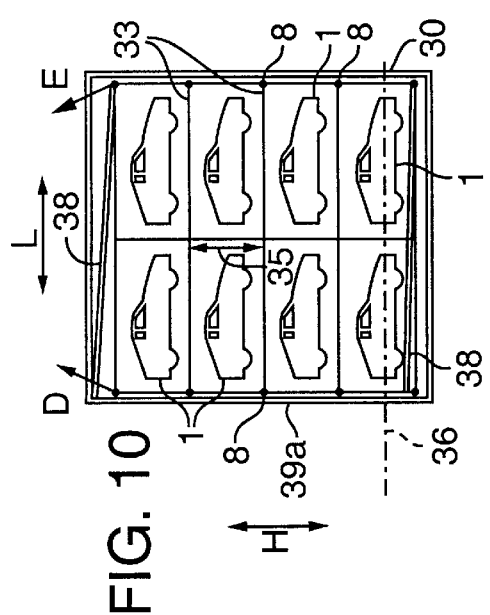
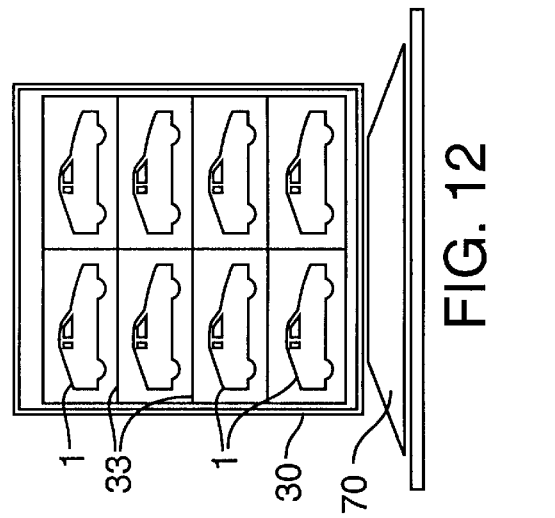
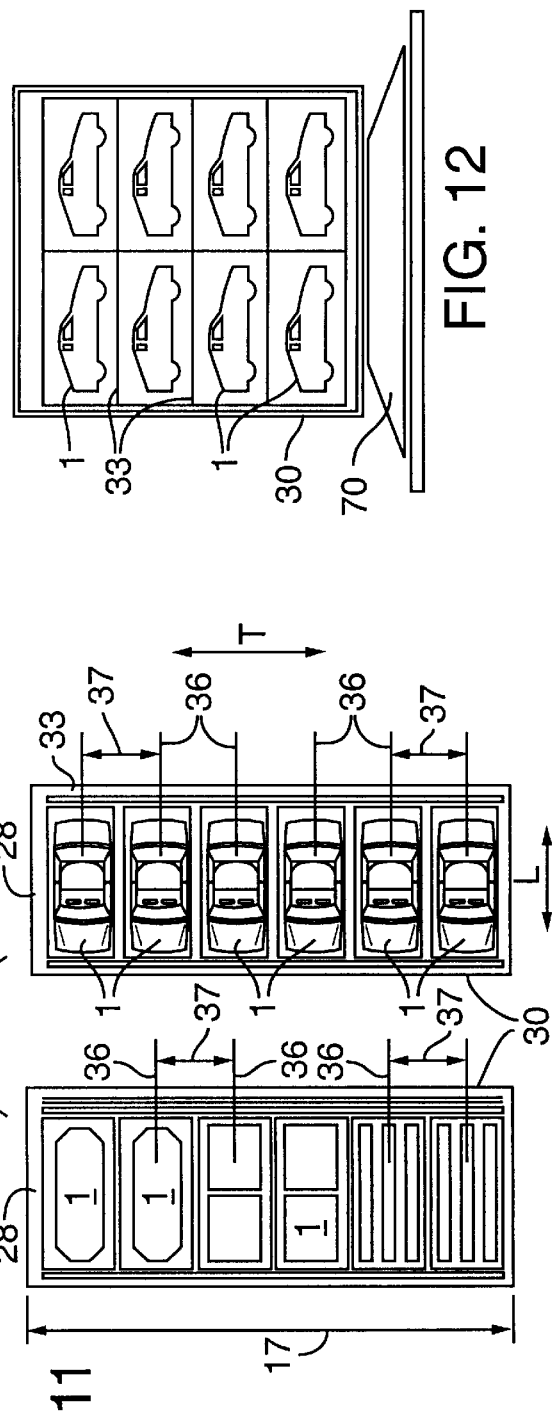

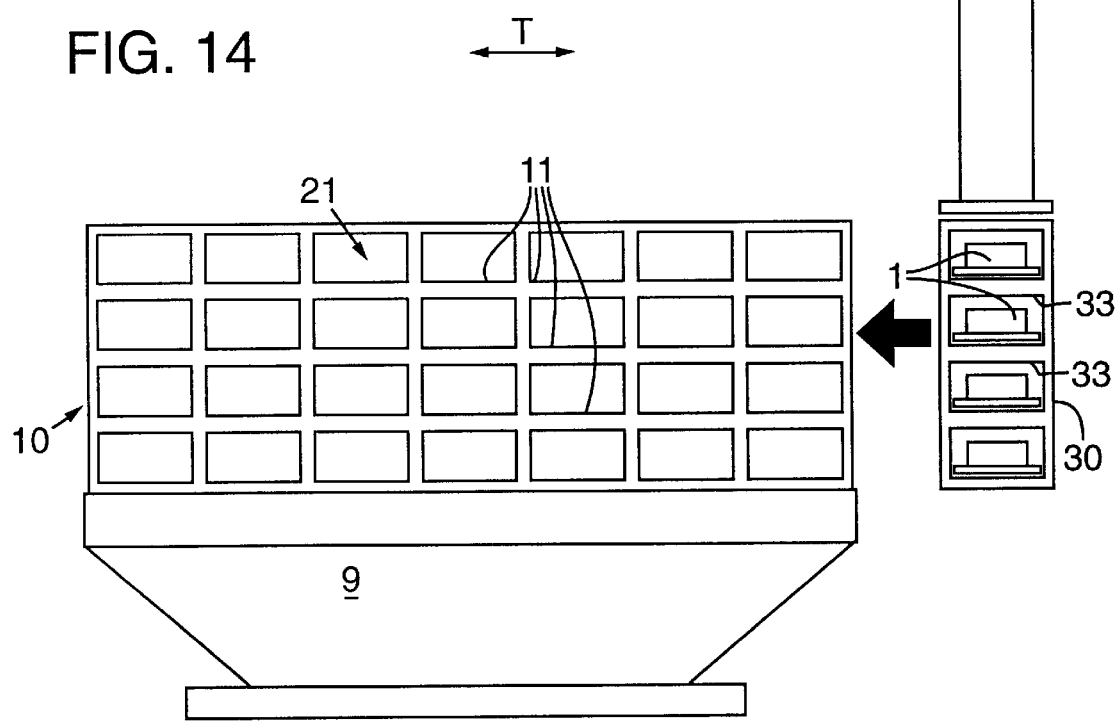

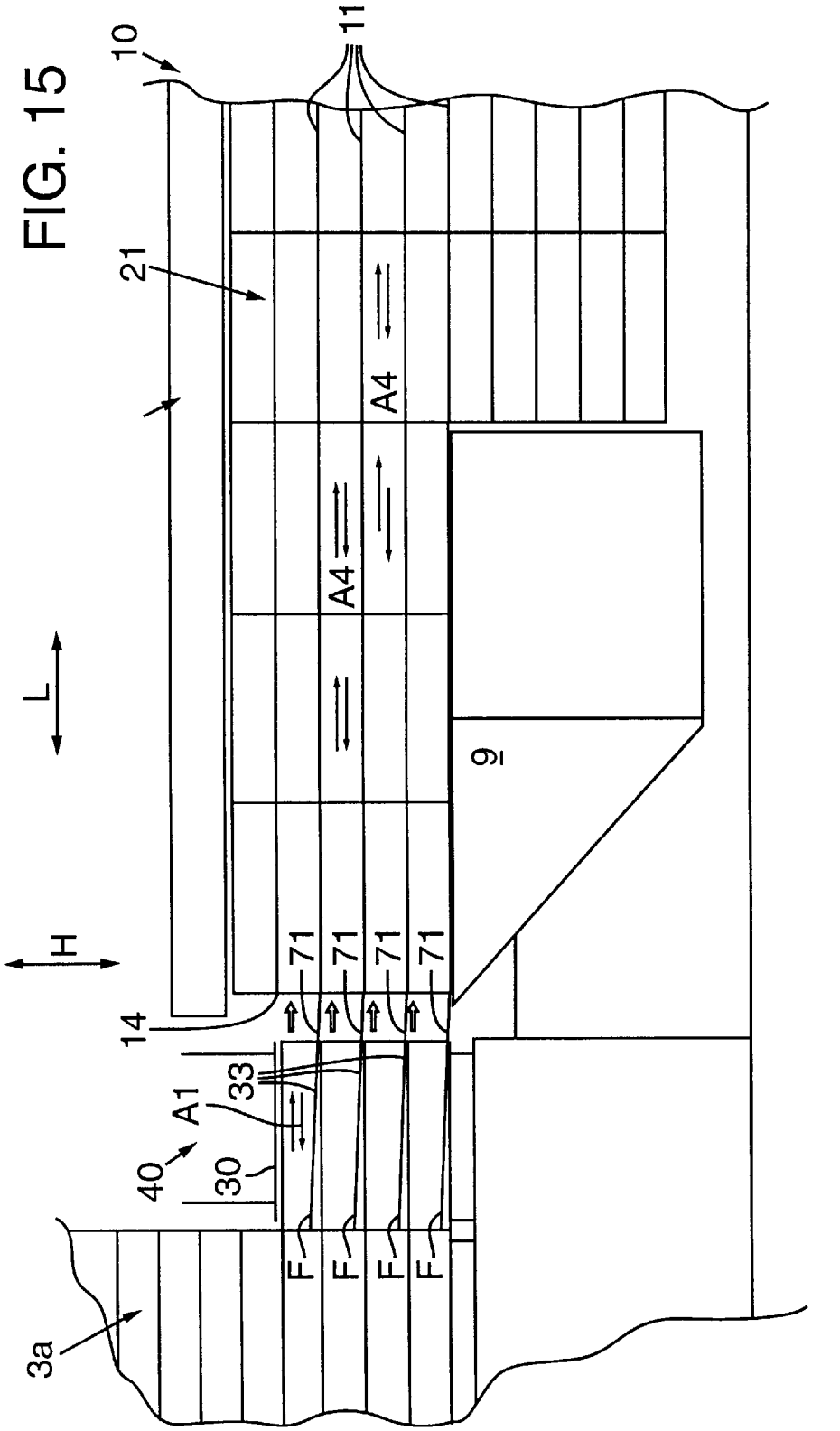

PORT ARRANGEMENT

The present invention relates to a port arrangement for transfering first-type freight units, such as wheeled vehicles and goods on cargo pallets, and possibly second-type freight units, such as containers and general cargo or bulk cargo positioned on equivalent large-size pallets, on one hand, from a storage or storage area on shore into a freight space of a ship, and on the other hand, from the freight space into a storage or storage area on shore; the freight space of the ship comprising a first freight space compartment forming a structural part of the ship, said compartment comprising a plurality of superimposed freight planes intended for first-type freight units, and the ship hull including freight handling apertures for conveying freight units into the freight space of the ship, or out therefrom; in which port arrangement, first-type freight units are moved by means of a lifting framework from the storage or storage area through the freight handling apertures, and further, to be in each case at predetermined freight planes of the first freight space compartment, and along the freight planes to a desired location for transport, and from which freight planes the freight units are unloaded using reverse operations, and further, with the lifting framework into a storage or storage area, said lifting framework including a plurality of frame unit locations on one or more loading planes thereof. Specifically, the invention relates to a procedure and related arrangements for handling simultaneously at least two types of freight to be shipped in different ways, the first freight type thereof being usually cars or equivalent wheeled vehicles.

The scope of the invention described above comprises both freight types, but especially, as regards cars and other general cargo, simultaneous operations of a plurality of different handlings, and the matching thereof. Therefore, e.g. storing of cars and other general goods placed on pallets or equivalent bases, such as freight units, on shore, transfer from such storage or equivalent into a ship, and the transfers and positioning within the ship must be decided upon, and said different handling steps have to be linked together to be operative. Similarly, conveying freight units in the opposite direction from the ship into a storage on shore has to be organized. The corresponding operations have to be organized also for storing, transferring containers and general goods placed on large-size pallets, or potential bulk goods, and for other handling operations.

Conventionally, the cars and other wheeled vehicles are stored in ports on wide areas, by driving on their own wheels and using their own motors. For such storing, wide areas of land are needed, in order to accomodate all cars of one big, car-transporting ship in such area. Secondly, loading cars from such area into a ship, respectively, unloading from a ship on such area requires that each car be driven individually, which takes a lot of labour, is slow, and may involve costs if cars are damaged. Though, there are hardly any other type of arrangements available in the ports. In cities and towns a great number of multi-storey car parks may be available in which the cars are brought in or taken out by driving along ramps. Then, the land surface area can be reduced, but otherwise the handling of cars is very much the same as in land areas. Suggestions have been made to position cars in multi-storey car parks in the manner of automated warehouses, using lifts and lifting apparatus, as disclosed in GB-2 166 721, U.S. Pat. No. 2,916,166, and GB 380 711. By means of such arrangements, the positioning of cars can be mechanized in generally car-specific compartments or parking places in a multi-storey car park at least partly, but even with said arrangements, no sufficient efficiency in space utilization can be achieved, this being due to the reasons stated below. Lift or crane wells have to be positioned in frequency, so that any car can at any time be brought into the multi-storey car park or taken out therefrom. A parking base and a height of equal size has to be reserved for each car, that is, the maximum indispensable parking volume, because provision must be made for each car to be positioned in any of the parking places because of said unanticipated incoming or outgoing order. One more prerequirement is that the owner expects to be able to go to and into his car while it is in the multi-storey car park, which further increases a need for space. In reference EP-340673 a suggestion is made on provision for a multi-storey car park, in which the cars have been arranged in rows from and to which rows the cars are moved with small-sized straddle carrier type cranes moving along the rows, said cranes moving along each row of cars and lifting one car at a time above the rest of the cars in the row. Herewith, the number of lifting shafts is reduced, but the height of each storey becomes doubled compared with the conventional one, so that there is hardly any saving in space compared with prior art designs. Besides, the arrangement is complicated. None of the prior art methods of storing cars has turned out to be an efficient way of storing.

The containers, in turn, are stored in storage areas by piling them in one-layer or multi-layer lines or rows, which is perhaps, considering the great weight of containers, the most appropriate procedure.

Cars can be moved from ashore into a ship for instance by driving in through the stern port or along the loading bridge, which as such is a straightforward continuation to driving to the storage area, but in itself, is slow and, considering the manpower, inefficient. Within the ship the cars may also be moved into their ultimate locations by driving along ramps, as disclosed in reference SE-448 712. This handling and storing in the ship is closely equivalent to the handling and storing in conventional multi-storey car parks, with the exception that the storing density is to some extent greater because no individual car need be taken out at any moment, instead, all cars are loaded and unloaded at one time. However, the ramps occupy plenty of space within the ship and driving an individual car is slow and, considering the labour force, inefficient.

Mechanized conveyors made as inclined loading bridges or ramps may also be used, as described in reference U.S. Pat. No. 4 106 640, but even this arrangement takes a lot of space in the ship and is nearly as slow a procedure as the above driving. Deviating from all handling procedures described above, the conveyor arrangement of said reference is appropriate for transferring general goods other than cars, but even in said use, the efficiency of the space utilization is poor.

In reference EP-528 185, a fully automatable transportation arrangement for car transport vessels is described which is based on lifts, cranes and horizontal conveyors. Also in this arrangement the cars are driven to the proximity of the vessel and along a short ramp onto the lifting base of a crane, whereon each individual car is lifted individually into the ship. Such individual handling step makes the loading and unloading a ship very slow because the cars cannot even be driven in a row as in using ramps. When unloading the car freight from the ship, the order is reverse. Within the ship the handling is performed with chain conveyors and on lifting platforms, and this is quite efficient, although the individual handling of cars leaves a lot to be desired. A massive conveyor handling like the one described above is, however, complicated and expensive. Said arrangement is not appropriate without certain changes for handling any general goods other than cars, and it is intended merely for car transporting vessels.

In reference DE-1 756 073, an arrangement partly equivalent to the previous one is disclosed with which arrangement a load positioned in containers is handled on board a ship. For horizontal transfers, the containers have been provided with rollers, and in vertical direction, containers are transferred with cranes or lifts. In this manner, the ship's freight space composed of decks can be stowed efficiently. This arrangement is in the sense difficult that prior to conveyance on board the ship, the goods have to be positioned in containers provided with rollers, and again unloaded from the containers after being removed from the ship. In addition, the containers have to be handled individually if aiming at efficient stowage. All in all, when acting as in the arrangement described above, the shipping is very slow and requires plenty of labour force.

References DE-2 211 452 and U.S. Pat. No. 3,537,414 illustrate the structure of a large-size pallet and placing of freight positioned on a large-size pallet in vertical direction in the freight space of the ship. For said purpose, the freight space of the ship is composed of vertical guides, along which the large pallets are positioned in place and with which they are locked during the sea transport. Said freight space is not therefore provided with any freight planes, that is, freight decks. The loading method described here is equivalent to an ordinary loading method of containers, and it is not adaptable as an efficient method of transporting cars.

In none of the references described above such loading is dealt with in which different types of freight are loaded, instead, each one of the references deal with handling of freight units of one type only, that is, merely handling of cars or merely handling of other general goods. Reference DE-1 178 733 shows transporting of both cars and other general goods in a uniform conventional freight space, that is, in a ship hold. According to the reference, the freight space of the ship has been divided with tween-decks into different parts, but otherwise, it is composed of open spaces. According tQ said reference, the general goods are placed in the freight-space by stowing and fastening as usual and the cars are inserted in collapsible lifting frameworks on shore and lifted along with the frameworks into the ship, and then, stowed in the manner known in itself in the art in the freight space. The frameworks are secured to the ship to prevent movements during the transport. Several cars can be positioned one on top of the other in said lifting frameworks. Since the frameworks may contain a plurality of cars, transfer from shore into the ship and back is relatively efficient. Transferring and securing the frameworks including cars within a ship is, on the contrary, slow and difficult, requiring great care in order to avoid damage. In addition, bringing said lifting frameworks with cars from a departure port to a destination port requires a great number of frameworks and transporting these back to the departure port, both of which operations increase the costs, even if the lifting frameworks have been made to be collapsible in order to save space in return transport. In this manner said procedure is not well appropriate at least for large-scale car transport.

Thus, the general object of the present invention is to provide a port arrangement using which at least wheeled vehicles like cars or other general goods on pallets or equivalent can be loaded on board a ship, and unloaded from board a ship in great quantities rapidly and efficiently so that the ship's port time is as brief as possible. More particularly, the aim of the invention is to implement the above general aim thereof and the more detailed aims to be defined below concerning loading and unloading a ship, in which, in addition to freight units of the first type mentioned above, also freight units of the second type can be transported, such as containers, general goods on large-size pallets, or possibly bulk goods. When most preferred, the invention is therefore related to, though not limited to, a ship of this type in which the freight space of a ship is composed of at least two structurally different freight space compartments, the first thereof being appropriate for transporting freight units of the first type and the other one for transporting freight units of the second type. The aim of the invention is therefore to provide a port arrangement in which at least freight units of the first type can be handled on shore, transferred from shore into the ship and back, and handled within the ship in as long portion of the handling chain as possible in large batches, efficiently and rapidly. The aim of the invention is a port arrangement in which different types of freight units can at least be loaded simultaneously into the ship and unloaded from the ship simultaneously, and one type and different types of freight units at least to some extent be both unloaded and loaded simultaneously. The aim of the present invention is further this kind of port arrangement in which the freight units can be stored while occupying very little space and surface area, i.e. being arranged compactly, both on land and in the ship. Yet one more aim of the invention is this kind of port arrangement which is easy to be mechanized and automated in that the apparatus are reliable in operation and relatively simple, and moderate in price. The port arrangement of the present invention should be applicable both in destination ports and intermediate ports of the ships.

In order to eliminate the drawbacks described above and to attain the aims defined in the foregoing, the port arrangement of the invention is characterized in what is determined in the characteristic features' part of claim 1.

The most important advantages of the invention include particularly loading and unloading of especially large-size cargo ships intended for transporting several different cargo types, disclosed in patent application PCT/FI94/00028, in that different types of general goods or freight units move simultaneously in storages on shore, simultaneously between the storages on shore and the ship, and within the ship, and transfer of relatively small-sized and often lightweight general goods, such as cars, in great batches at one time, in storages on shore, between the storages on shore and the ship, and within the ship, all of which shortens the port stay time. Other advantages of the invention include reduction of handling relatively small-size and often light-weight general goods manually or individually, or elimination thereof entirely, as well as efficient utilization of the port area. A third advantage of the invention is that the above mentioned arrangements related to large ships are applicable in the same form, or only slightly modified, also for loading and unloading small vessels, such as barges. This means, for instance, that the means and arrangements with which a cargo of a big vessel is unloaded significantly more efficiently in a port than before are, when most preferred, applicable as such for loading a small vessel in the same port also more efficiently than before.

The invention is described more in detail referring to the accompanying drawings.

FIG. 1 presents one port arrangement of the invention in top view.

Figure 2:
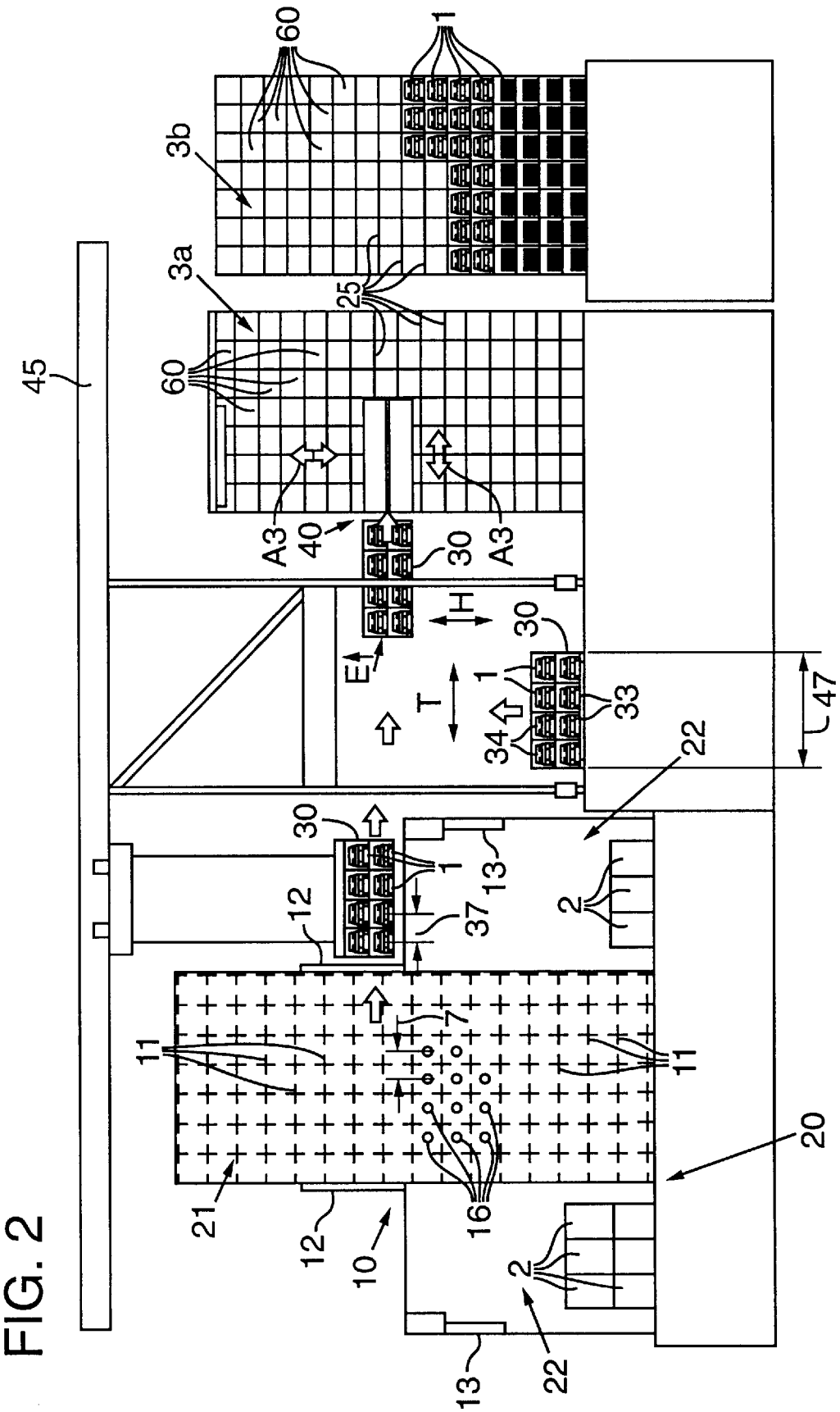

FIG. 2 presents the port arrangement of FIG. 1 horizontally along plane II—II for loading and unloading a ship on a side thereof.

Figure 3:
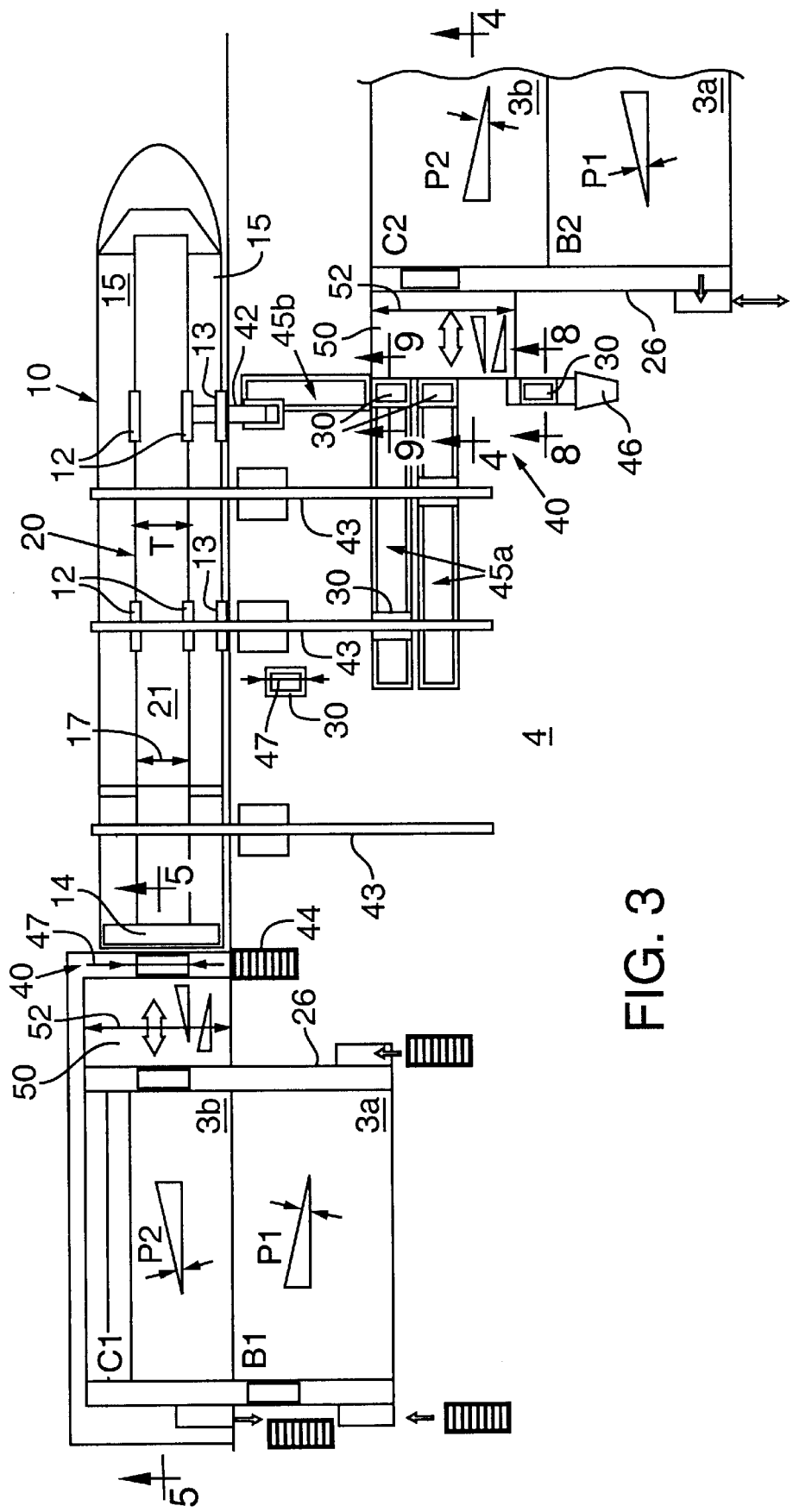

FIG. 3 presents a second port arrangement of the invention in top view.

Figure 4:
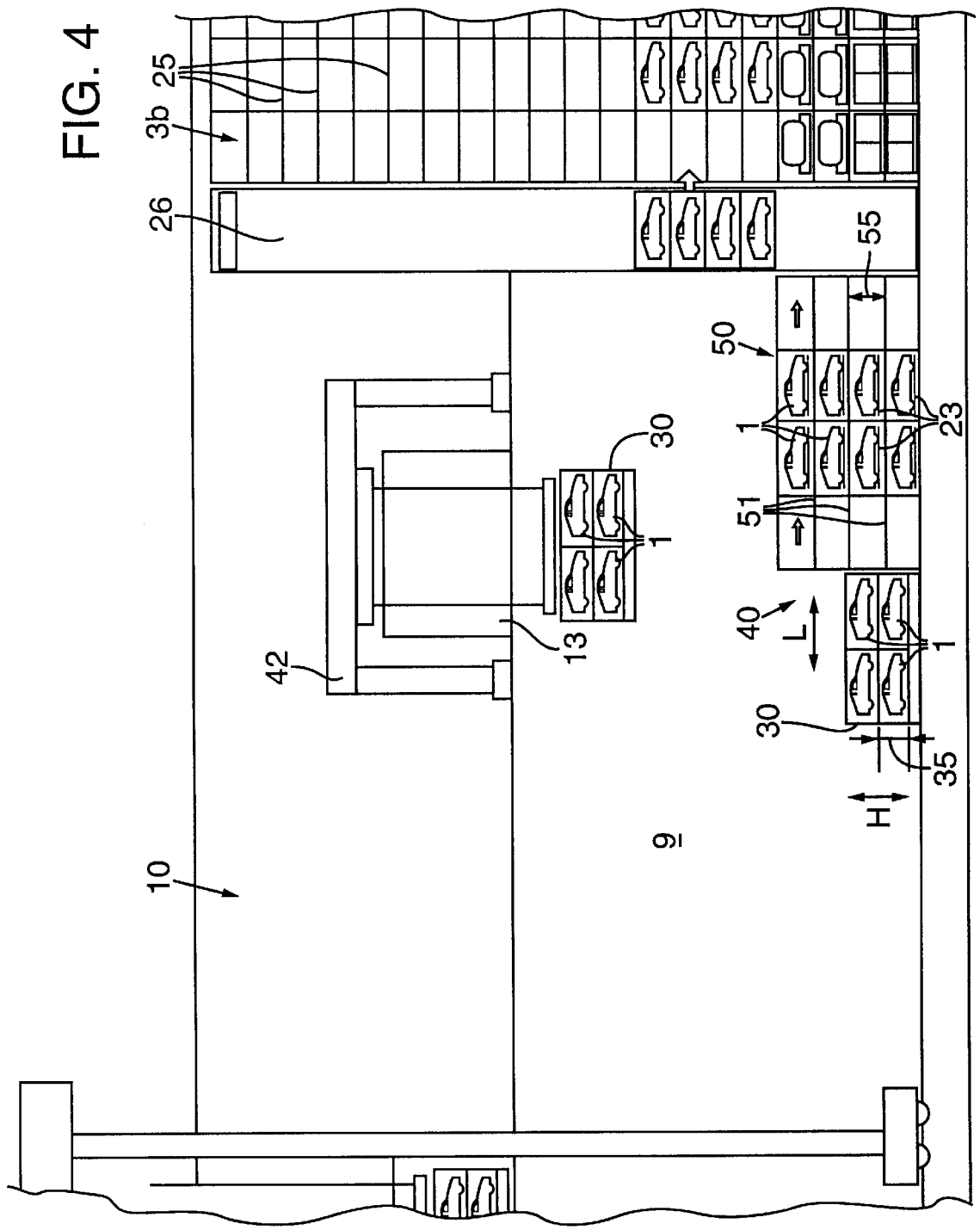

FIG. 4 presents the port arrangement of FIG. 3 horizontally along plane IV—IV for loading and unloading a ship on a side thereof.

Figure 5:
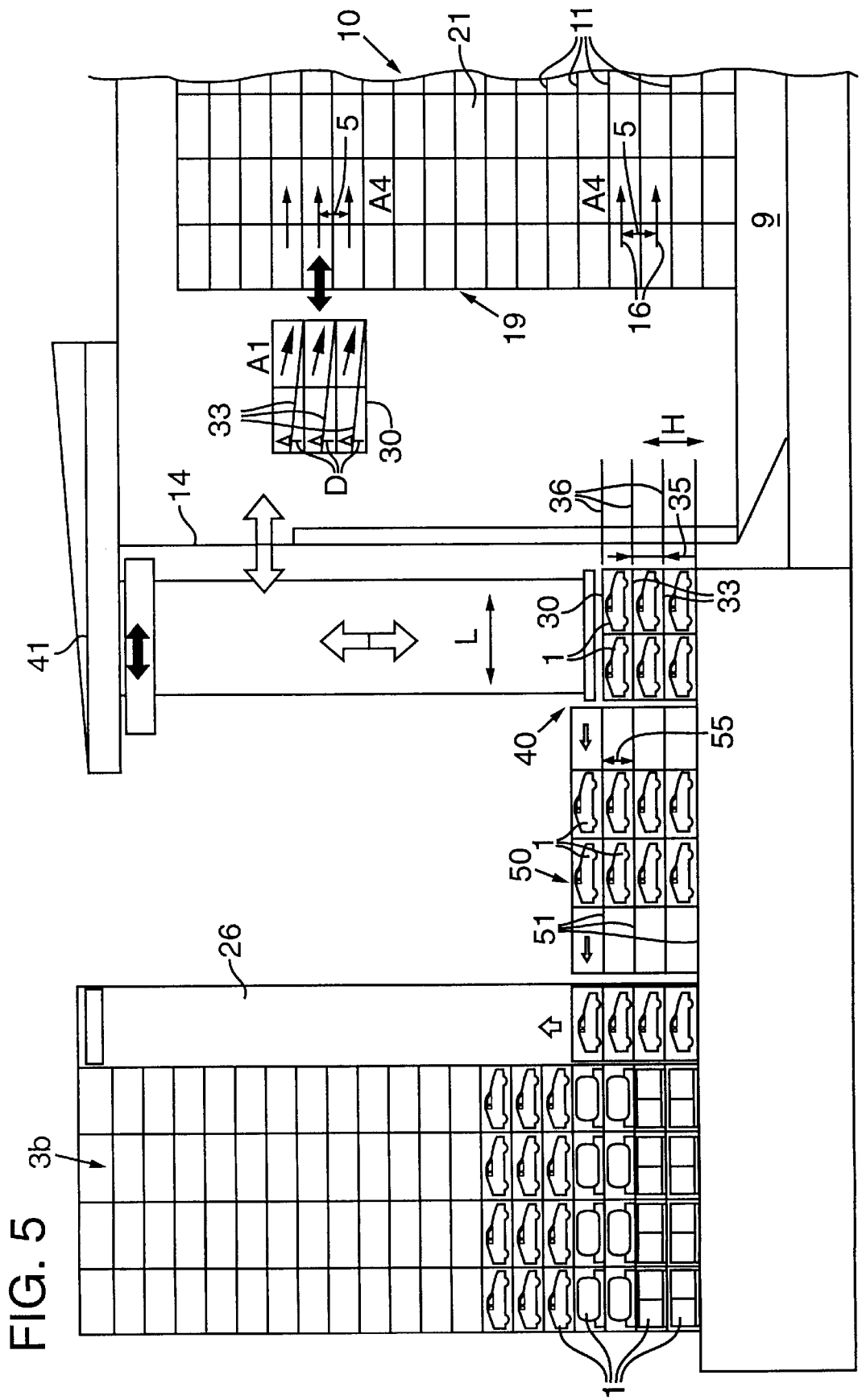

FIG. 5 presents the port arrangement of FIG. 3 horizontally along plane V—V for loading and unloading a ship in the stern.

Figure 6:
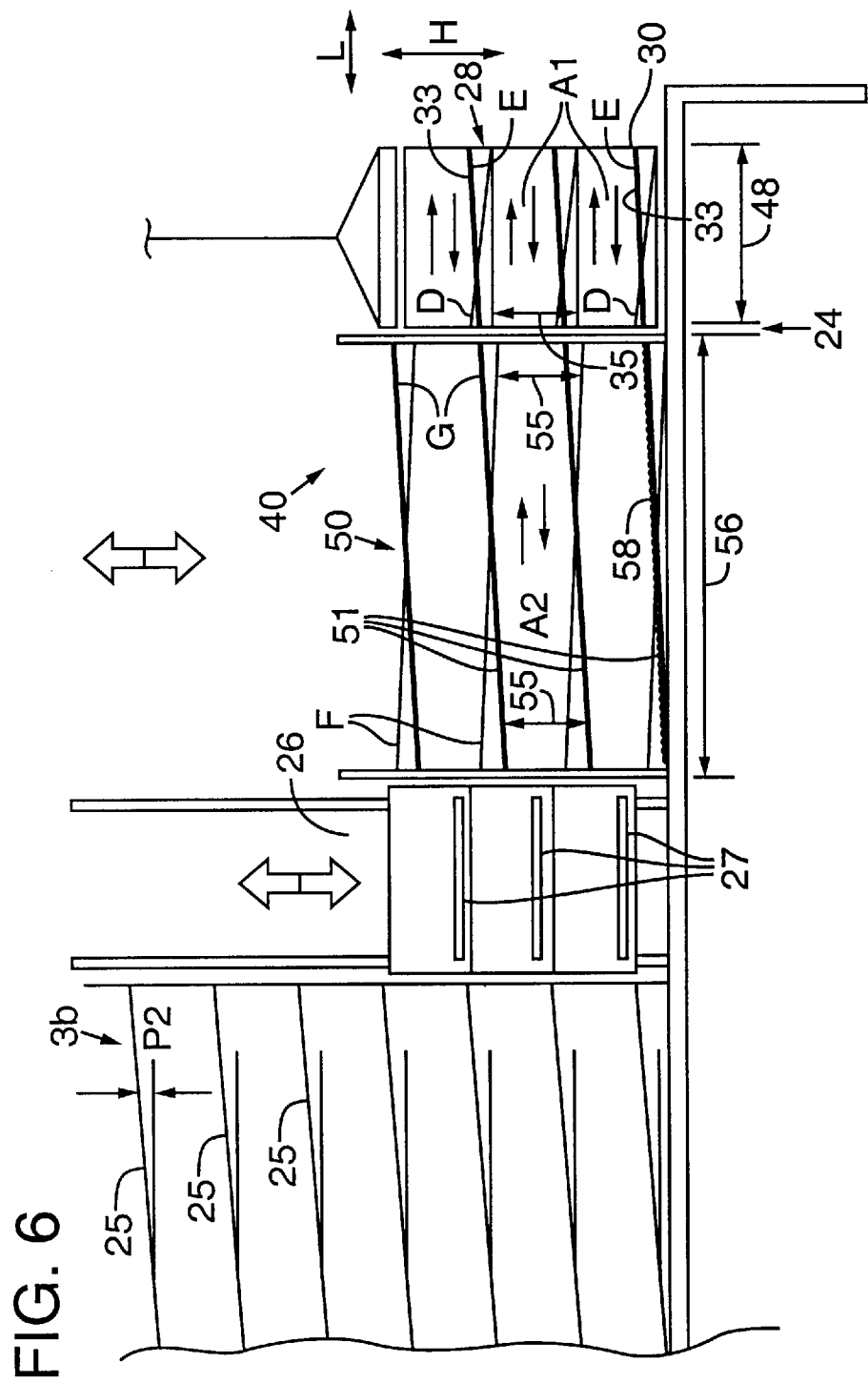

FIG. 6 presents the main principle of a lifting frame of the invention to be used in the port arrangement of the invention and the main principle of a loading site thereof in exaggerated appearance in the same view as FIG. 5.

Figure 7:
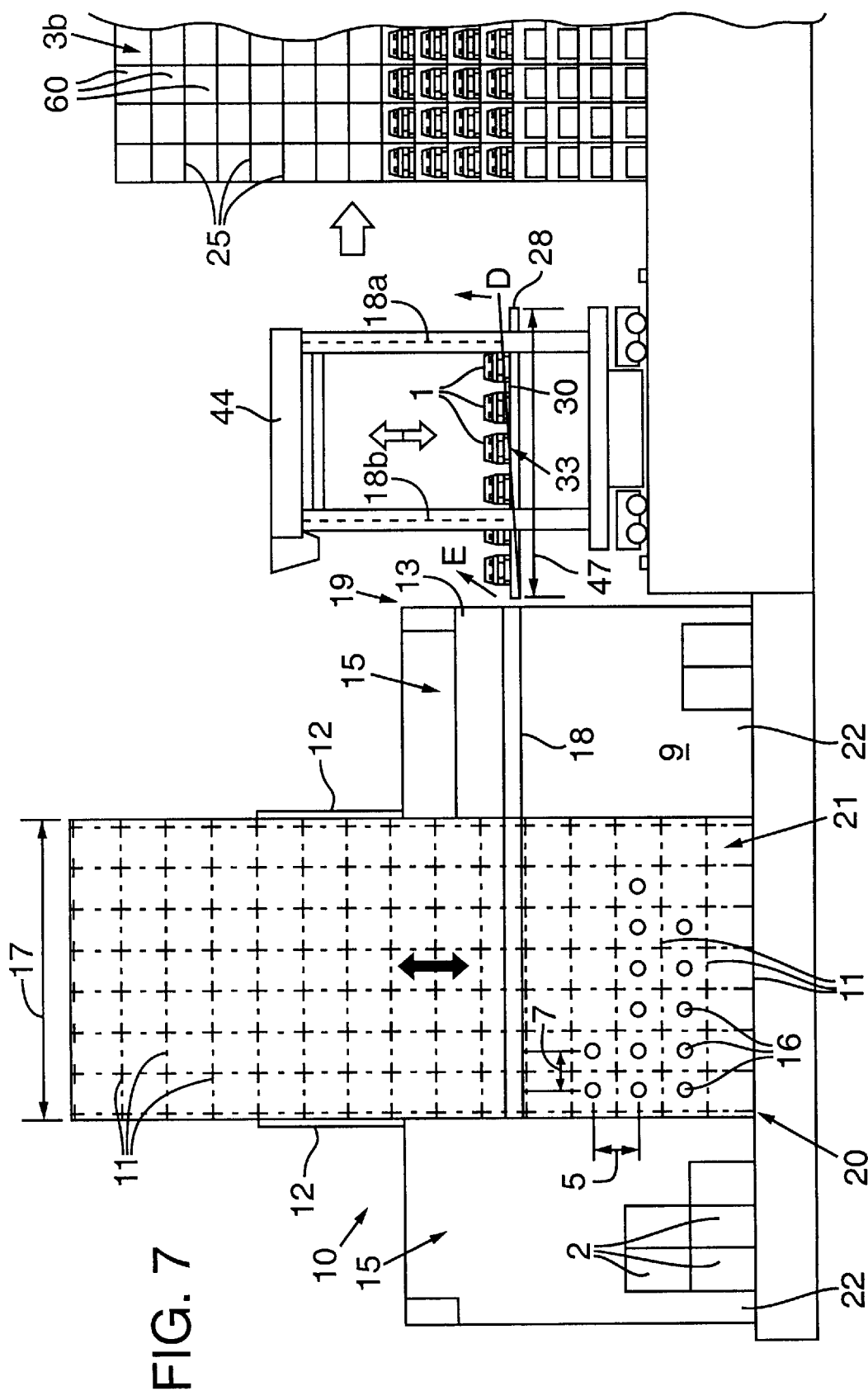

FIG. 7 presents the port arrangement of FIG. 1 horizontally along plane VII—VII for loading and unloading a ship on a side thereof.

FIG. 8 presents a first embodiment of the lifting framework of the invention in a longitudinal section of a ship along plane VIII—VIII of FIG. 3, with the inclusion of one transfer means of the lifting rack.

FIG. 9 presents the first embodiment of the lifting framework of the invention in longitudinal section of a ship along plane IX—IX of FIG. 3, with the inclusion of a second transfer means of the lifting framework.

FIG. 10 presents a second embodiment of the lifting framework of the invention in longitudinal section of a ship in the same view as FIGS. 8 and 9.

FIG. 11 presents a third embodiment of the lifting framework of the invention, with two parallel pieces in the figure, in top view and loaded with various general goods.

FIG. 12 presents a method of transferring the lifting framework of the invention in the same view as in FIGS. 8 to 10.

Figure 13:
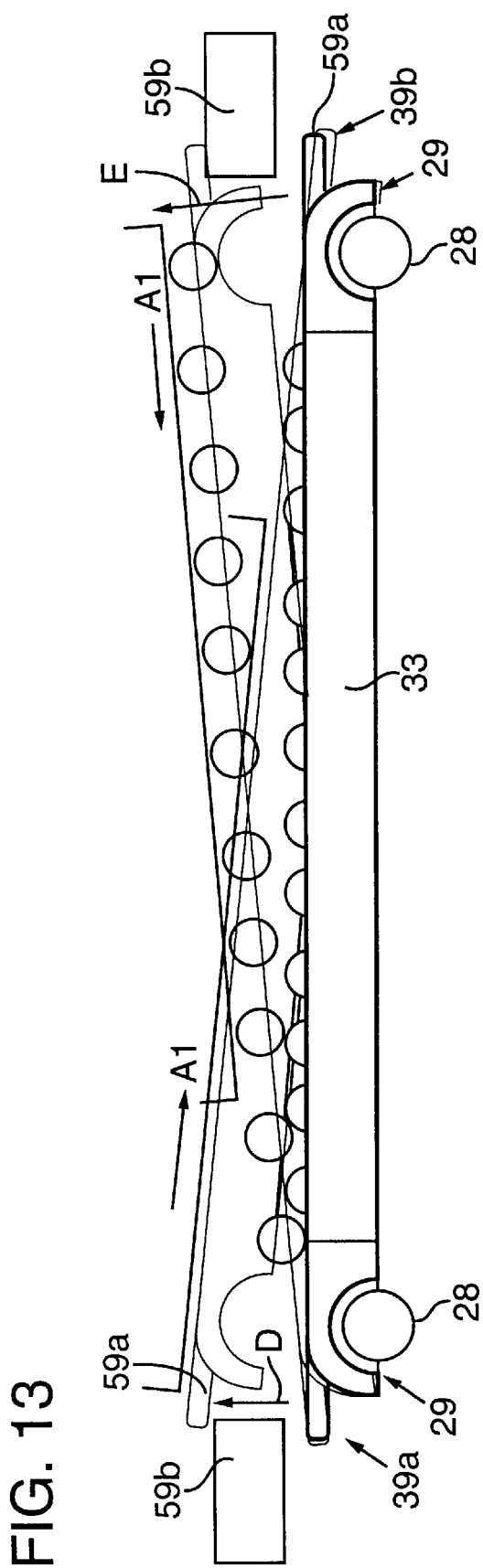

FIG. 13 presents on enlarged scale a longitudinal section of a loading plane of the lifting framework of the invention in the same view as in FIG. 6.

FIG. 14 presents another modification of the port arrangement of the invention for loading and unloading a different ship at a side thereof in similar view as in FIG. 2.

FIG. 15 presents one more modification of the port arrangement of the invention for loading and unloading a ship at the stern in the same view as in FIG. 5.

The invention relates particularly to loading and unloading a cargo ship of the type described in the copending patent application PCT/FI94/00028. Said cargo ship 10 has been arranged to carry cars, train units and other wagons, and other first type general goods on pallets in a first freight space compartment 21 of the ship's freight space 20. Said first freight space compartment 21 comprises a great number of superimposed freight planes 11, composed of a space grid structure which is a self-supported entity and so elastically supported to the hull 9 that deformations of the hull under way are not entirely transmitted to the space grid structure. In addition to this, in a ship of said type, second-type freight units 2 are transported in an second freight space compartment 22 thereof, such as containers and general goods placed on large-size pallets equivalent to containers, or alternatively bulk goods. Into the first freight space compartment 21, first-type freight units 1 are conveyed through freight handling apertures 12 and 13 on the side of the boat or through the freight handling aperture 14 at the stern. Through said freight handling apertures 12 to 14, first-type freight units 1 are conveyed into the first freight space compartment 21 substantially in horizontal direction Al. Within the ship 10, the first-type freight units 1 are conveyed to be at the freight planes 11 and pushed onto the freight planes and further, along the freight planes to a desired location for transport. And, unloading said freight units 1 from the ship is caried out using reverse operations. Into a second freight space compartment 22 of the ship 10, comprising a container cargo hold or equivalent, the containers or equivalent goods on large-size pallets are conveyed and removed at vertical locations 15. Said type of ship is illustrated in FIGS. 1 to 5 and 7. The invention is not, however, limited to loading a ship of the type described above, instead, by means of the port arrangement of the invention, any vessel or ship can be loaded and unloaded in which the first-type freight units 1 are conveyed onto freight planes of a freight space for transport. Said second type ship is illustrated in FIGS. 14 and 15. It goes without saying that the freight handling apparatus of a ship have to be compatible with the port arrangement required by the invention, and the parts thereof.

A cargo boat 10 may in principle be provided with one freight plane 11 only when the boat is a very small barge or something like that, but in practice, because of transporting efficiency, the ships are provided with several, at least two or three, superimposed freight planes 11. Now, also the properties of the lifting framework described below are well-founded and the desired advantages are clearly gained therewith. Thus, said lifting framework 30 can be used for loading even such small boats and unloading the cargo thereof, but its use will be highly efficient in larger ships provided with a plurality of superimposed freight planes. The barge of FIG. 14 includes four cargo planes, which leads to a relatively high transport and loading efficiency, and the cargo boat of FIG. 1 includes sixteen freight planes. Preferably there are at least four freight planes 11, but preferably more than that, such as ten superimposed planes.

The invention is primarily related to transfer of first-type freight units 1, such as cars and general goods positioned on pallets, on a plurality of freight planes 11 of the cargo boat 10 and off therefrom, but if needed, in the one and same cargo boat 10, according to the invention, also second-type freight units 2 can be transferred, such as containers and other equivalent freight positioned on large-size pallets. The containers and heavy-weight goods 2 positioned on large-size pallets of container order of magnitude are loaded in the second freight space compartments 22 of the ship 10 in the manner described in the copending patent application PCT/FI94/00028 through the closable apertures 15 on top thereof, not described more in detail in the present context. Normally, said second freight space compartments 22 are located in the proximity of the sides of the ship 10, as is clearly visible in FIGS. 1 and 7. When most advantageous, the loading and unloading of said second-type freight units 2 can be accomplished at the same time as the loading and unloading of the first-type freight units 1.

Smaller-sized first-type freight units 1 which are loaded in a first freight space compartment 21 with grid construction are transferred with a lifting framework 30 from a storage or storage area on shore through said cargo handling apertures 12 to 14 into a ship. For a high loading efficiency, said lifting frameworks 30 include a plurality of locations for freight units 1 on one or more loading planes 33 thereof. As taught by the invention, the lifting framework 30 is a unit of permanent structure wherein a plurality of first-type freight units 1 can be positioned vertically H and/or longitudinally L and/or transversely T to the ship. For such purpose, the lifting framework 30 includes at least one loading plane 33, as shown in FIGS. 7 and 11. The lifting framework 30 of the invention may also include a great number of loading planes 33. The lifting framework shown in FIG. 2 includes two loading planes 33, the lifting framework in FIG. 5, three loading planes, and the lifting framework shown in FIGS. 8 to 10, four loading planes 33 are visible. The number of loading planes 33 is selected according to the first freight space compartment 21 of the ship 10 to be loaded in each instance, and according to the handling apparatus in conjunction therewith. In any case, the lifting framework according to the present invention is permanent in structure, which means that it is not collapsible in any part or that the collapsibility is not part of the handling of the freight units. The permanent structure of the lifting framework also means that the lifting framework is a structural part of the port arrangement of the invention and is not conveyed away from the port area loaded with freight units, instead, it operates with the cargo merely in the port when loading and unloading the transport means associated with the port. Therefore, the lifting framework is provided with freight units only associated with loading and unloading a ship but not in the course of marine transport of the freight units. Accordingly, the lifting framework may travel along with the ship but it is not then used as an apparatus carrying freight units. In addition, the freight units 30 are rigid and bearing in the structural frame 28 in that the lifting framework 30 can be lifted by engaging appropriate points therein without deforming the shape of the lifting framework detrimentally. The frame 28 of the lifting framework 30 may therefore be a plate-like bearing structure 28, provided with e.g. a beam structure, as shown in FIGS. 7 and 11 or a grillage structure 28 combined of bars and plates as shown in FIG. 6 and FIGS. 8 to 10. Although the lifting framework 30 itself is rigid, and fixed and permanent in structure in each instance, it must be understood that the loading planes 33 within the lifting framework 30 are, if needed, vertically displaceble relative to each other and/or to the lifting framework to enable positioning of freight units 1 of different sizes. It is necessary that especially the distance 35 between the loading planes 33 can be arranged to correspond to the distance 5 between the freight planes 11 within the ship 10, and inclined in the manner and for the reason explained more in detail below. Typically, the net distance between the loading planes 33 is, likewise the net distance between the freight planes of the first freight space compartment 21 in the ship, at least when transporting cars, of the order of magnitude 1.5 m or 2.1 m, or something within or approximating said values. In fact, the distance between the loading lines 16 is greater by the base thickness of a loading plane, respectively by the base thickness of the freight planes. A lifting framework 30 may also be built of permanent element structure, whereby for-each loading, that is, for each ship and for each freight handling aperture 12 to 14 used therein a lifting framework is assembled to be appropriate for said purpose, to be permanent in the course of said loading or unloading.

The port arrangement of the invention comprises loading sites 40 on land for transferring first-type freight units 1 between a storage 3a and 3b on shore and a lifting framework. In said loading sites 40, first-type freight units 1 are transferred into a lifting framework 30 when a ship is loaded and it is in the same loading sites 40 in which the freight units 1 are removed from the lifting frameworks 30 when unloading the ship. In addition, the port arrangement comprises conveyor means, such as a stern gantry crane 41 included in the ship structures, fixed or mobile side gantry cranes 42 included in the ship structures, container cranes 43 included in the fixed assemblies of the port area, straddle carriers 44 moving in the port area, transport tracks 45a, 45b, and tractors 46, or equipment for displacing a lifting framework by means of an air cushion 70. Lifting frameworks are transferred with said conveyor means 41 to 46 between any one of the loading sites 40 and a first freight space compartment of the ship, respectively a freight handling aperture 12 to 14. Said loading sites 40 are fixed on shore, each one thereof being located at most at the transport distance of one of the above conveyor apparatus from the freight handling aperture of the ship corresponding thereto. Thus, the loading site 40 shown in FIG. 5 behind the ship is at the lifting distance of the ship's stern gantry crane 41 from said ship, and in the embodiment of FIG. 3, the loading site 40 on the ship's side is located at the lifting distance of the ship's longitudinal conveyors 45a and container cranes 43 from the ship, respectively, at the lifting distance from the ship provided by the ship's transverse track 45b and the side gantry crane 42 included in the ship's structure. In the embodiment of FIG. 1 the loading site 40 behind the ship is located at the transport distance provided by the track 45c and the stern gantry crane 41 from the freight handling aperture 14 at the stern. Respectively, in embodiment of FIG. 1 the loading sites 40 on the ship's side are located at the lifting distance of the container crane 43 from the upper freight handling apertures 12 on the ship's side and at the lifting distance of the straddle carriers 44 from the lower freight handling apertures 13 on the ship's sides, as can be seen also in FIGS. 2 and 7. As taught by the invention, when loading a ship, a lifting framework 30 is filled with freight units 1 in the loading sites 40 from a storage on shore, the lifting frameworks with the freight units are transferred with a conveyor means 41–46 into the ship, and within the ship, the first-type frame units 1 are removed from the lifting framework 30 and moved along the freight planes 11 of the ship's first freight space compartment to the positioning locations during the transportation. Mean-while, or thereafter, the lifting framework 30 is displaced empty from the ship to the loading site 40 for refilling. In this manner, the lifting framework 30 passes into the ship filled-in and from the ship to the loading site 40 empty when the ship is being loaded. When the cargo 10 of the ship is unloaded, the operations are reverse, whereby the lifting framework 30 is filled with the freight units 1 coming from each freight plane 11 of the first freight space compartment 21 of the ship, whereafter the lifting framework 30 and the freight units therein are moved to the loading site 40 where the freight units 1 are removed from the lifting framework. Thereafter, the lifting framework 30 is carried empty into the ship to be filled again with freight units 1 in the manner described above.

In a practical implementation, at least one lifting framework is used for each of the freight handling apertures 12 to 14 of the ship. So, in conjunction with the loading of the ship 10 shown in FIG. 3 said ship comprises one freight handling aperture 14 at the stern, two upper freight handling apertures 12 on the side, and two lower freight handling apertures 13, at least five lifting frameworks 30 are typically used. In this manner the ship 10 can be loaded and unloaded rapidly because freight units are moved simultaneusly through each freight handling aperture and a plurality of freight handling units 1 at a time in each freight handling aperture. It is also conceivable that e.g. two lifting frameworks 30 are used for each freight handling aperture 12 to 14, so that one of each lifting framework pair is, for instance, filled at a loading site on shore and the other one is simultaneously emptied on board the ship, whereafter one lifting framework travels filled-in in one direction and the other lifting framework empty in the opposite direction. And, when unloading the ship, the operations are reverse. However, the present embodiment requires a plurality of conveyor means or exact coordination of the operation steps in order to benefit it fully.

The lifting frameworks 30 used in loading and unloading of a ship may in each case be mutually similar or different. For instance, the lifting frameworks 30 with which freight units 1 are moved between the upper freight handling apertures 12 of the ship and the loading sites 40 may be comprised of a lifting framework shown in FIG. 2, wherein four cars are placed in parallel in the ship's transverse direction T and two on top of each other vertically H, and for instance, one, or two, as shown in FIGS. 8–10, in succession in the ship's longitudinal direction L, i.e., 8 to 16 cars at a time. When using the freight handling aperture 14 in the stern of the ship, the lifting framework shown e.g. in FIG. 5 or FIGS. 8–10 be used in which there are cars in three, or respectively, four storeys in vertical direction H, and one or two in succession in the ship's longitudinal direction L and the ship's transverse direction T the same number as in the lifting framework of FIG. 2, that is five, in parallel, but preferably six, as in the embodiment of FIG. 11. When loading vertically at the ship's stern, as in embodiment shown in FIG. 5, one or two freight units only are used in succession, so that this freight handling aperture 14 would not occupy excessive freight space of the ship. Instead, if a ship is loaded and unloaded at the stern horizontally, as in embodiment of FIG. 15, a very great number of freight units can be used in succession in the ship's longitudinal direction because a freight handling aperture 14 like this is not occupying any space at all in the ship. Therefore, said lifting frame receives 24 to 28 cars in one time. A lifting framework 30 may accomodate even a greater number of cars or other freight units to be transferred, with the provision that the lifting framework 30 has been dimensioned to carry a load of this size, which is no particular problem because of the relatively small volumetric weight of the cars. When receiving 6 to 10 cars, the load of the lifting framework is of the order of magnitude 10 to 15 tons, and when a lifting framework receives e.g. 30 cars, it is 30 to 40 tons, which type of load-bearing lifting frameworks are quite easy to be constructed. Appropriate cranes and other handling equipment are generally available, so that, considering the equipment, substantially no new constructions are needed for embodying the invention. Therefore, lifting frameworks can easily be arranged with which, for instance, a hundred of cars can be transferred between the ship and the loading site and, respectively, a storage on shore. Care has to be taken that a batch of cars of this size, transferred with a lifting framework 30, can be transferred within the ship from the lifting framework into the ship, and vice versa, and respectively, in the loading site 40 from the storage to the lifting framework, and vice versa. Into the lower freight handling apertures 13 on the ship's side, freight units, such as cars, can advantageously be moved with a lifting framework 30 provided with one loading plane 33, as shown in FIG. 11, on which framework six cars have been placed, in the embodiments of FIGS. 7 and 11, in parallel in the ship's transverse direction T. A lifting framework of this size is utilizable for handling with a straddle carrier 44 in the manner presented in the figures, but if the conveyor means is different, there is no obstruction to why not use more sizable lifting frameworks in conjunction with this freight handling aperture 13 in which cars have been placed also in succession in the ship's longitudinal direction or superimposed in the ship's vertical direction H. If said lower freight handling aperture 13 on the ship's side passes in the form of a tunnel through the second freight space compartment 22 of the ship to the area of the lift well of the first freight space compartment, as shown by broken lines in FIG. 2, it may well be appropriate to define the number of at least the superimposed loading planes e.g. to one or two, and similarly, the number of freight units placed in succession in the ship's longitudinal direction L e.g. to one or two, so that no excessive volume is occupied from the second freight space compartment.

In the instance in which the loading sites 40 on land are located in the adjacency of the ship's sides or tightly close to the stern, or approximately in alignment with the ship's side or stern, the type of the conveyor means can be limited to mere or almost mere lifting apparatus 41–44 for transferring the lifting frameworks at least in vertical direction H. This is explained so that in such instance no major horizontal transfers need be performed in the port area, instead, the transfers can be made with the ship's own cranes 41 and 42 or container cranes 43. This situation is prevalent in the embodiment of FIG. 3 in which the loading site 40 is directly within the range of operation of the stern port crane 41.

Within the ship 10, the freight units 1 can be moved between the lifting framework 30 and the first freight space compartment 21 of the ship in two different ways. In the first transfer mode, the horizontal distances 37 between the positioning locations 36 of the freight units in the lifting framework 30 are equal to the horizontal distances 7 between the loading lines 16 in the ship's first freight space compartment, and further, if there are several superimposed loading planes 33 included in a lifting framework, the distances 35 of vertical direction H thereof are equal to the distances 5 of the superimposed freight planes 11 of the ship's first freight space compartment. Hereby, a special arrangement has been made so that the positioning locations 36 of the freight units in the lifting framework, that is, the loading lines 36, are precisely at the same vertical H distances and the ship's transverse T distances from one another as the loading lines 16 of the freight space compartment 21. Now, the lifting frameworks with the freight units can be moved directly from the loading site 40 into a first freight space compartment 21, and especially in that the loading planes 33 are aligned to the predetermined freight planes 11 of the freight space both in vertical direction H and in the ship's transverse direction T, whereafter the freight units are moved to the freight planes 11 of the freight space compartment from all loading planes 33 of the lifting framework 30 at the same time, and similarly, all freight units in parallel in the transverse direction T of the ship at the same time. Unloading of all freight units of this lifting framework 30 in this manner onto the freight plane 11 of the freight space takes, when shortest, only a few seconds, and when longest, some minutes. A typical period would be from half minute to two minutes. It is obvious that the loading efficiency is top class when ten or tens, or even a hundred of cars are unloaded in such a period of time. It is obvious that the freight units are moved, when unloading the ship, in similar fashion, in one batch from several freight planes 11 of the ship with several freight units at a time onto a plurality of loading planes 33 of the lifting framework 30. In such instance, both loading into the ship and unloading from the ship are accomplished so that the ship's freight space compartment 21 and the loading lines 36 and 16 of the lifting framework 30 are in complete alignment. Such loading procedure is illustrated in FIGS. 2, 4 and 5 and 14 and 15. The directions described above are valid when the loading lines 16,36 are the ship's longitudinal directions L, as in FIGS. 2,4,5 and 15, but it is obvious that the same principles are valid even if the loading lines are the ship's transverse directions T, as in FIG. 14. In embodiments of FIGS. 2, 4 and 5, loading into the ship and from the ship is accomplished in the lift shaft of the freight space 21, whereas in the embodiment of FIGS. 14–15 the D loading into and from the ship is carried out directly on a side of the freight space 21, whereby no lift shafts are needed in the freight space. The latter procedure is particularly advantageous in smaller ships.

FIG. 7 presents another loading procedure in which the lifting framework 30 is used according to the invention. In said loading manner, the freight units are lifted with a lifting framework 30 to be at the ship's freight handling aperture 13 and the freight units are moved with a move in transverse direction T to the ship from the loading plane 33 of the lifting framework onto an equivalent plane 18 within the ship, which in the present instance forms the floor of the tunnel through the second freight space compartment 22. The plane 18 is required to include a conveyor operating according to some principle, such as motorized power rollers, a chain conveyor, or equivalent. From that point onwards, the freight units within the ship are moved with lift apparatus and conveyors, not shown in the figures, to be at a predetermined freight plane 11 of the first freight space compartment 21, and along said freight plane to be in the positioning location during the transport. In embodiment of FIG. 7, the lifting framework 30 is provided with one loading plane 33 only, but there may be more than that, although the use of the apparatus will then be somewhat more complicated. On said loading plane 33, only one freight unit 1 may be positioned longitudinally to the boat, as in FIG. 11, or more than that, as in the other lifting frameworks illustrated. In any case, even on said one loading plane 33, several freight units 1 can be positioned adjacent to one another in transverse direction T to the ship.

With the aid of a lifting framework construction 30 according to the present invention, provided with one loading plane, as described in the preceding paragraph, such freight units 1 can be moved which are much heavier in weight than cars and positioned on pallets and equivalent. In FIG. 11. six of such heavy-weight freight units 1 have been placed in parallel on a loading surface of a lower lifting framework 30. Since said heavy-weight freight unit may weigh 10 tons, a load on said one-plane lifting framework may be 60 ton order of magnitude, that is, about the same order of magnitude as about fifty cars, as described above. With the use of a different lifting framework for so different types of freight units, for heavier freight units those receiving a smaller number, and for lighter-weight freight units those receiving a greater number, the capacity of the loading and transfer equipment can be utilized optimally, and the loading and unloading of a ship will be rapid, particularly in proportion to the lifting capacity of the equipment available.

The structure and utilization of the lifting framework 30 described above becomes possible in that all loading planes 33 of the lifting framework are provided with means 31 reducing motion resistance, so that transferring freight units 1 on said loading planes, mainly in horizontal direction A1, is executed with simple means. Particularly the fact that the means reducing the motion resistance are included in the loading planes of the lifting framework permits different types of freight units 1 to be lifted with the one and same lifting framework, that is, the freight to be transferred is not confined to any given general cargo. Said means 31 intended for reducing the motion resistance of the lifting framework are preferredly comprised of rollers, which are components made familiar in references such as U.S. Pat. No. 4,182,440 and GB-1 594 662, not described more in detail in the present patent application. Means reducing motion resistance may also be comprised of ball planes known as such in the art and therefore, not described any further here. If a rollerway is used as means for reducing motion resistance, as shown schematically in FIG. 8, the lifting framework 30 has to be loaded and unloaded using parallel but opposite in direction, horizontal A movements, which are often transfers in longitudinal L direction of the ship. In the embodiments shown in the figures, said loading procedure is applied, except in FIG. 7, in which a transfer procedure in a transverse direction L to the vessel is presented as an example. If for the means 31 to reduce motion resistance a ball plane or an air cushion known in itself in the art is used, the loading and unloading of the lifting framework 30 can be carried out in directions transversal to each other. This may be avantageous, as regards the positioning of loading sites 40 in relation to storages 3a,3b and to the vessel 10, and to the loading and unloading techniques of the lifting framework 30. However, the use of ball planes and air cushions is more expensive and requires more maintenance than the use of rollers the construction of which can be easily simplified. Thanks to the means 31 reducing the motion resistance as described above, the freight units can be moved from and to the loading planes 33 of the lifting framework at very small horizontal A force.

Said horizontal A force in the loading planes 33 can be provided, for instance, by means of a chain circulating in the loading planes 33, not shown in the figures, provided with projections projecting above the plane in order to move freight units. Another method to supply force is to use hydraulic cylinders or pneumatic cylinders which push directly or by means of a lever mechanism the freight units on the loading planes 33. Small inclination of the loading planes 33 is considered to be the simplest and most preferred means of providing horizontal force. Such inclination of the loading planes 33 makes the freight units 1 move due to the effect of gravity. This method is particularly recommended because therewith simultaneous emptying and filling of several loading planes can easily be arranged. There is no reason to why not use power-operated rollers in a roller system instead of the inclination of the loading plane. In such case it may be enough that only a few of the rollers at regular intervals are machine-rotatable, the rest, i.e. preferredly majority of the rollers, are freely rotating. The use of said lifting framework 30 provided with power-rollers is equivalent to the use of a lifting framework provided with inclinable loading planes 33. When using the above-described inclination of the loading planes, the inclination required is estimated to correspond to a lifting of edge 39a, 39b of the lifting plane of the order 5 to 10 cm, when the length of the loading plane in the direction of inclination is of the order of 10 meters, so that the requisite inclination in order to receive a motion of the freight units is of the order 1:100 to 1:200, but now and then a greater inclination is needed, e.g. 1:50, or, even an inclination as small as 1:400 may be enough. The sensitivity of the roller or ball system is decisive in selecting an inclination.

When comparing FIG. 5 and its schematic FIG. 6, it is easy to understand that when the loading planes 33 of the lifting framework 30 are inclined in a first direction, i.e. upwards away from an edge of the freight levels 11 in the first freight space compartment 21 of the ship, that the freight units on said freight planes move, owing to gravity, approximately in horizontal directions Al from the lifting framework onto the freight planes 11 of the freight space compartment in the direction of the loading lines 36 of the lifting framework and the loading lines 16 of the freight space compartment. This transfer of the freight units is depicted with arrows A1 and A4 in FIGS. 5 and 6. Similarly, when wishing to move freight units from a lifting framework in a loading site 40 for instance into a buffer storage 50, respectively from a freight plane 11 in the ship onto a loading plane 33 of the lifting framework, the loading planes are inclined at the opposite edge, that is, in another direction E, shown with thicker lines in FIG. 6. Now, it is obvious that the freight units in the ship move from the border point 19 between the lifting framework 30 and the freight space compartment 21 into the lifting framework, respectively in loading site 40, from the lifting framework e.g. into a buffer storage 50 or on other equivalent planes. At this point it is clear that the lifting framework can be loaded and unloaded by means of simple inclinations in opposite directions D,E. The loading plane or planes 33 of the lifting framework is/are essentially in horizontal level when the lifting framework moves between the ship's first freight space compartment 21 or the freight handling aperture 12 to 14 and a storage or a storage area on shore, and particularly the loading site 40, whereby the freight units are not allowed to move during this transfer. FIG. 7 shows an equivalent method of inclination when the lifting framework includes one loading plane 33. Hereby, the inclination of the loading plane in one direction D makes the freight units 1 move along a loading plane 33 provided with friction reducing means 31 through the freight handling aperture 13 into the ship. An inclination E in opposite direction would move the freight units 1 from the border point 19 of the freight space compartment 21 and the lifting framework to the side of the lifting framework 30. In the embodiments of the figures, the opposite inclinations D,E form, when using the freight handling aperture at the stern of the ship, the in;lined planes in the longitudinal direction L of the ship as well as in using upper freight handling apertures 12, directly at the freight planes 11 of the first freight space compartment 21. When using lower freight handling apertures 13 on the sides of the ship in which the freight units are moved from the lifting framework with the conveyors of the ship to be transported further, and vice versa, the opposite inclinations D,E are in the transverse direction T to the ship. It is clear that the inclination directions are selected according to the way in which the lifting framework is unloaded and filled in. However, the longitudinal and transverse directions of the ship are usually most advantageous.

The loading planes of the lifting framework 30 can be inclined in a variety of ways. One possibility is to provide inclination bearings 29 within the fixed frame of the lifting framework around which the loading planes are made to turn. Said inclination bearings have to be positioned on each opposite edges 39a and 39b of the loading plane therebetween and the frame 28, as presented in FIG. 13. When the loading plane 33 is lifted at either edge of D or E, it is obvious that the plane inclines when turning around the inclination bearing 29 of the opposite edge. Another option is to provide an inside articulated inclination framework 38 within the lifting framework 30 in which the angles or bevels of the loading planes and vertical supports have been formed into articulations or at least into elastic points 8. When one side 39a or 39b of the inclination framework 38 is now lifted while the opposite side 39b, respectively 39a, remains below in the original position, it is clear that the shape of the inclination framework changes and the level of the loading planes 33 fastened thereto becomes inclined, as shown in FIG. 10. In this manner the inclination of all loading planes 33 in the lifting framework can simply be made to occur simultaneously. A power unit with which either one side of said inclination framework 38 can be lifted up at one time or all loading planes 33 of the lifting framework can be inclined at one edge at one time, may as such be any mechanical power unit, such as a hydraulic cylinder, cam or lever, or an engine-driven wire or chain, or equivalent. Said power units are not described more in detail in the present applied cation. Said power unit may be located in the lifting framework 30 itself, in a means transporting the lifting framework, like in straddle carrier 44 or container crane 43, or in the fixed equipment of the loading sites 40. While inclining D,E, the weight of the lifting framework may also be used, e.g. by arranging a continuation 59a in each loading plane which is supported to the fixed portion 59b of the loading site 40 and of the hull of the ship 10, so that, when the lifting frame is descended a little lower, it lifts edge 39a or 39b of the loading plane. Also a wedge penetrating by means of a power unit between the loading plane 33 and the frame 28 of the lifting framework may be used.

Between the lifting framework 30 and the first freight space compartment 21 of the ship 10, the freight units may also be moved via drawbridges 71, as is shown in FIG. 15. Therein, the lifting framework is only moved in vertical direction H in the instance in which the width thereof in the width direction of the ship is equal to the width of the freight handling aperture 14, whereby the loading planes 33 of the lifting framework and drawbridges 71 merely transport freight units from the storage 3a in the form of through flow A1 directly into the freight space compartment 21 of the ship. Within the freight space compartment 21 freight units are moved using an appropriate conveyor, such as power rollers, air cushions, ball planes, chain conveyors, or equivalent, in direction A4 to ultimate locations for transport. When unloading cargo from the ship, the operations are, of course, reverse. The drawbridges 71 are preferably included in the lifting framework as parts thereof, being e.g. hinged thereto at the loading planes.

The lifting frameworks according to the invention are advantageous to load and unload at loading sites through buffer storages 50. Said buffer storages 50 comprise handling planes 51 the width 52 whereof being at least equal to the width 47 of the lifting framework, and which handling planes 51 there are provided at least as many as there are loading planes 33 in the lifting framework used in said loading site. The vertical spaces 55 between the handling planes 51 of the buffer storages 50 are equal to the spaces 35 between the loading planes of the lifting framework, and the length of the handling planes 51 is at least equal to the total length 48 of the freight units to be loaded in the lifting framework in one time in said direction A1. In other words, the transverse area of the buffer storage 50 in a plane at right angles to the loading direction A1 and hence, to the loading lines 16,36, is at least equivalent to the cross-section area of the lifting framework in the same direction, whereby, when the lifting framework 30 is positioned as an extension to the buffer storage 50, as shown in FIGS. 4 to 6, the freight units can be moved at one time from the buffer storage into the lifting framework, and vice versa. With the use of buffer storage 50, the lifting framework 30 can be unloaded and filled in a very short period of time, this being only a few seconds when shortest, and a couple of minutes when longest. Thus, there will be no essential wait times for the lifting framework in loading sites 40, either. As a consequence, the loading and unloading efficiency of the ship is top class. The volume of the buffer storage 50 relative to the freight units 1 is therefore at least the same as the number of freight units transferred by the lifting framework 30. In practice, it is appropriate to arrange the buffer storages 50 to be essentially larger than the transport capacity of the lifting frameworks. A buffer storage may typically be twice or three times the lifting capacity compared with the lifting framework when measured by the number of freight units, but it can be even greater.

In buffer storages, freight units 1 are in principle moved in the same way as in lifting frameworks. For said purpose, the handling planes of the buffer storage include means 58 to reduce motion resistance in the planes 51 thereof, as presented schematically in FIG. 6 regarding one handling plane 51. Said means reducing motion resistance may in this case be roller ways, ball planes, air cushions, and equivalent. Preferably, roller ways are used because there is no need to move freight units in a buffer storage in more than two directions, and for this purpose, a roller way of simple construction is useful. At this point, horizontal force exerting an effect in the loading direction A2 can be provided simply by inclining the handling planes 51 either on an edge of the lifting framework in direction G, to have therewith an appropriate indication angle for unloading the ship, or on an edge off from the lifting framework in direction F to provide an appropriate opposite direction for loading the ship. Said inclinations G and F are depicted with a thick, respectively thin line in FIG. 6. Thus, the purpose is that said handling planes 51 are continued to be fed with freight units 1 while loading the ship, and alternatively, freight units are continuously unloaded from said handling planes 51 when unloading the ship. It is obvious that with said inclinations G,F of the handling planes 51 and inclinations D,E of the loading planes 33 of the lifting framework, transferring of freight units can be provided between the lifting framework aligned to the buffer storage 50 and said buffer storage from the handling plane to the loading plane, and vice versa. As regards the magnitude of the inclinations of the handling planes 51, the same is valid what is described above in association with the lifting plane. It is obvious that with the handling planes, freight units can be moved by means other than inclination. For instance, chains provided with projections moving approximately in the direction of the handling planes may thus be used to grasp the freight units and move them in either direction. Hydraulic or pneumatic pushing devices may also be used for transferring freight units supported by the means 58 reducing motion resistance. An alternative is to use power rollers in the roller ways so that only some of the rollers in the roller ways are power-driven. These rollers may be positioned slightly higher up and they have a rougher surface, in order to move freight units along the rest of the rollers. The handling direction A2 in said buffer storage is always the same as the handling direction A1 of the lifting framework aligned thereto.

FIG. 2 shows an embodiment of the port arrangement of the invention in which no buffer storages are provided, instead, the freight units are moved directly between multi-storey storages 3a or 3b and lifting framework 30. In this instance, the handling direction A3 of the freight units illustrates the transfer direction of the lifting framework 30 and the freight units therein in the lift shafts of the storage compartments 3a and 3b, said handling direction A3 being transverse T to the ship and vertical. The freight units are moved off from the lifting framework and into the lifting frameworks directly onto the floors of the storage cells 60 of the storage compartments B1–B4 and C1–C4, respectively, from the floors 25 in the lift shafts of the storages in the handling direction A1, respectively, onto the freight planes 11 of the ship's first freight space compartment and from the freight planes longitudinally L to the ship. Direction A1 is in this instance at right angles to the plane shown in FIG. 2, as is the longitudinal direction L of the ship. In FIG. 2 both the ship 10 and the storages 3a, 3b are illustrated at the lift shafts thereof.

In principle, the freight units can be transported into the buffer storages 50 of the invention, and off therefrom, by any conveyor means known in the art and transferred to any proper storage area. However, it is preferred, according to the present invention, to use a multi-storey storage on shore, particularly when first-type freight units have been placed on pallets and preferably on adjustable pallets disclosed in patent application PCT/FI94/00033. In a case like that it is advantageous to provide two storage compartments, viz. a first storage compartment 3a for freight units 1 which are intended to be moved from shore into a ship, and a second storage compartment 3b for freight units 1 which are intended to be moved from a ship ashore. It is preferred that both of said storage compartments 3a, 3b are comprised of elongated storage cells 60, the floors 25 thereof being preferably made from roller ways provided with slight inclination P1, respectively P2, for moving freight units within the storage with gravity. Specifically, an inclination has been directed to convey freight units 1 towards the conveyor 26 or away from the conveyor 26 with which the freight units are handled between said storage compartment 3a and 3b and the loading sites 40. In FIGS. 1 and 3 said storage compartments 3a,3b are indicated as well as the directions of the inclination angles P1 and P2 thereof. Therefore, the freight units in storage C1 and C2 of FIG. 3 travel away from the conveyor 26, and consequently, from the loading site 40 formed by buffer storage 50, due to the effect of inclination P2. Respectively, inclination P1 in storage compartments B1 and B2 conveys freight units towards conveyors 26 and consequently, towards the loading sites 40 formed by buffer storages 50. Thus, all storages C1–C4 shown in the figures are provided for incoming freight and storages B1–B4 for outgoing freight. As can be seen in the figures, said loading sites 40 provided with buffer storages are typically provided with one buffer storage 50 for a combination B1+C1, B2+C2 of one first storage compartment and one second storage compartment, whereby both of said storage compartments can be fed and unloaded with one buffer storage 50 by changing the inclination of the handling planes 51 thereof or the direction of rotation of potential power rollers. An individual buffer storage may also be used for each storage compartment 3a, 3b. It is not usually expedient to arrange the floors 25 of the storage compartments 3a, 3b to be inclinable because it would require substantial quantities of energy because of the great size of the storages. As a matter of fact, it is in principle possible, as is the use of power rollers, but these are not considered advantageous.

Even if a port arrangement did not include a buffer storage, as in embodiment of FIG. 1, it is, nevertheless, preferred to arrange the freight units in the storage compartments 3a, 3b described above and to arrange these always into a combination within each loading site 40, such as storage compartment combinations B1+C1, B2+C2, B3+C3 and B4+C4 in FIG. 1, because in such cases the loading and unloading of a ship can be implemented along the same routes determining the loading site, as can be seen in the figures.

What applies in a ship, applies also in storages 3 in which it is advantageous to position heavier freight units 1 in the lower parts of the storage and the lighter freight units in weight, such as cars, in the upper parts of the storage, as presented schematically in FIGS. 2, 4, 5 and 7. Now, also the heavier freight units located more below can be handled with smaller-sized lifting frameworks and with different lifting and transport equipment than the lighter freight units located higher up.

Transferring freight units with conveyors 26 between the storage compartments 3a and 3b and the buffer storage 50 can be implemented with any known conveyor serving the purpose, such as elevator lift or equivalent. Said conveyor 26 may include an equivalent number of transport planes 27 or a different number of transport planes 27 compared with those used in buffer storage 50 and/or lifting framework 30. Also these transport planes 27 can be provided with elements reducing motion friction, such as roller ways, ball planes or air cushions. Similarly, said transport planes 27 can be provided with members producing horizontal force, such as power rollers, inclination of planes 27, or other construction described above in the present application. In addition, conveyors of different types, known in high storages, may be used. Heavy-weight freight units located on lower levels and various lifting frameworks potentially used thereon can advantageously be handled with articulated jacks. In the port arrangement presented in FIG. 3 in which the conveyors 26 are placed between the storage compartments 3a, 3b and the buffer storages, the transport planes 27 of the conveyors may include transfer means to move freight units in the same direction only as in which the freight units move in the storages 3a, 3b and in the buffer storages 50. For this purpose, a transfer mechanism operating in two opposite directions is enough, which can be of any known type used in lifting frameworks or buffer storages. In the port arrangement shown in FIG. 1, either the lifting frameworks or the transport planes of the conveyors operating in the lift shafts of the storages are required, depending on the mode of operation, comprise means wherewith freight units can be transferred in two directions opposite to one another. This kind of arrangement can be provided with planes inclinable in crossing directions when the means reducing motion resistance is a ball plane or an air cushion. Cross-wise power rollers may also be used, with the provision that e.g. the height plane thereof can be changed relative to each other for independent use of said rollers. A plane turning about the vertical axis and provided with a conveyor is not highly preferred because it occupies a lot of space, and the shape of the transport plane and/or the bottom plane of the lifting framework becomes limited by it.

In addition, the port arrangement of the present invention includes storage areas or storages 4 for storing second-type freight units 2, which customarily mean relatively wide land areas. From said storage area 4, freight units 2 of the second type are transferred e.g. with straddle carriers 44, container cranes 43, or other equivalent apparatus into a second freight space compartment 22 of the ship in vertical direction H in that the operation area thereof is preferably located outside the coverage surface formed by the travelling of the apparatus used for transferring first-type freight units 1. Hereby, freight units of both the first type and the second type can be loaded in a ship simultaneously, respectively unloaded simultanously so that said procedures do not substantially cause interference with each other.

We claim:

1. A port arrangement for transferring first-type freight units including wheeled vehicles and goods on pallets, and second-type freight units, including containers and general goods or bulk goods positioned on respective large-size pallets, on one hand from a storage or storage area located on shore into a freight space of a ship, and on the other hand, respectively from the freight space of a ship to a storage or storage area on shore; the freight space of the ship comprising at least a first freight space compartment forming a structural part of the ship, said compartment including a plurality of superimposed freight planes for first-type freight units, and the hull of the ship comprising freight handling apertures for conveying freight units into the freight space of the ship and out therefrom; in which port arrangement first-type freight units are transferred with lifting frameworks from a storage or storage area through the freight handling apertures and further, to be each time at predetermined freight planes of the first freight space compartment and along the freight planes to a desired location for transport and from which freight planes the freight units are unloaded using reverse operations, and further with a lifting framework into a storage or storage area, the lifting framework comprising a plurality of positioning locations for freight units on one or more loading planes thereof, characterized in that the lifting framework is adapted for loading and unloading the ship during which a plurality of first-type freight units can be placed in vertical direction and/or in longitudinal direction and/or in the ship's transverse direction, and which includes means reducing motion resistance in said loading planes to enable movement of said freight units mainly in horizontal direction during loading and unloading of the ship, on one hand, for conveying said freight units into the lifting framework in the storage area, and for removing therefrom in the area of said freight handling aperture of the ship or in the first freight space compartment by said approximately horizontal transfers when loading the ship, and on the other hand, for conveying the freight units into the lifting framework within the area of said freight handling apertures of the ship or in the first freight space compartment and for removing therefrom by said approximately horizontal transfers when unloading the ship.

2. Port arrangement according to claim 1, characterized in that the port arrangement comprises loading sites having a lifting framework and means for conveying first-type freight units between storage area on shore and the lifting framework, that the port arrangement comprises further Conveyor means for transferring the lifting framework between the loading site and the ship's first freight space compartment, respectively, a freight handling aperture, and that the loading sites are fixed, each thereof being located at most at the transport distance of the conveyor means from the freight handling aperture corresponding thereto.

3. Port arrangement according to claim 2, characterized in that the further conveyor means comprise at least lifting means for transferring lifting frameworks at least in the vertical direction, than said lifting means are cranes or straddle carriers on board the ship or on shore, or other equivalent freight handling means, and that the loading sites are preferably at the lifting distance of the crane means in each case from the freight handling aperture and/or approximately aligned with the side or aft of the ship, or their extensions.

4. Port arrangement according to claim 3, characterized in that, if needed, the conveyor means comprise a transport track or equivalent for transferring the lifting framework on shore between the loading site and an unloading position of said lifting means.

5. Port arrangement according to claim 4 characterized by elements for inclining the lifting framework and the loading planes which are comprised of inclining bearings located between a fixed frame of the lifting framework and the loading planes, and approximately on the edges of the loading planes, around which the loading planes are inclined by lifting on an opposite edge, or of an inner articulated inclination framework of the lifting framework, the inclination of the loading planes therein is accomplished on account of deformation of the inclination framework by lifting the inclination framework on one side with a lifting means, or by moving different lifting members of the lifting means to lift the lifting framework between the ship and the storage or storage area into another height position.

6. Port arrangement according to claim 2, characterized in that in the loading sites at least one buffer storage freight 8 units is located in each site thereof, said buffer storages comprising handling planes, the width thereof being equivalent to at least the width of the lifting framework, while the width of the lifting framewvork preferably corresponds to the width of the first freight space compartment in the ship, and at least as many handling planes are provided as there are loading planes in the lifting framework at equal vertical spaces as spaces of the loading planes of the lifting framework, and the length of the handling planes being at least equivalent to total length of all freight units summed and loaded at one time in the lifting framework in a loading direction, that the freight units are moved between the handling planes and the bases of the lifting framework by aligning them to each other and using elements to provide a horizontal force for transferring said units, and that freight units are continued to be supplied upon the handling planes when loading the ship and continuously removed therefrom when unloading cargo from the ship.

7. Port arrangement according to claim 6, in which first type freight units have been positioned on pallets or equivalent, characterized in that the handling planes include means to reduce motion resistance in their planes, said means being preferably roller ways, ball planes, air cushions or equivalent, and inclinable in the direction of a direction side of the lifting framework in order to transfer freight units with said horizontal force from the handling planes onto the loading planes of the lifting framework, and inclinable in opposite direction, in order to transfer freight units with said horizontal force into a storage or storage area on shore.

8. Port arrangement according to claim 1. characterized in that in the loading planes of the lifting framework, the means for reducing motion resistance in order- to transfer freight units are comprised of roller ways, ball planes or equivalent, or air cushions or equivalent, supported whereby the first- type freight units can be moved either by inclining the loading plane needed in each case or by push means operating in the direction of the loading plane, or by another device producing horizontal force.

9. Port arrangement according to claim 1, characterized in that a loading plane or loading planes of the lifting framework are inclined in a first direction when transferring freight units from the lifting framework into a ship in a first freight space compartment, or in a freight handling aperture of the hull when loading cargo into the ship and inclined in a second direction when transferring freight units from the lifting framework into a storage or storage area on shore in a loading site when unloading cargo of the ship, further characterized in that the loading plane or loading planes of the lifting framework is/are substantially in horizontal plane during transfer between the first freight space compartment or the freight handling aperture of the ship and the storage or storage area on shore and that actuation means for inclining loading places of the lifting framework are located either in the lifting framework or in means conveying the lifting framework, or in the ship and in loading sites.

10. Port arrangement according to claim 9, characterized by elements for inclining the lifting framework and tile loading planes which are comprised of inclining bearings located between a fixed frame of the lifting framework and the loading planes, and approximately on the edges of the loading planes, around which the loading planes are inclined by lifting on an opposite edge, or of an inner articulated inclination framework of the lifting framework, the inclination of the loading planes wherein is accomplished on account of deformation of the inclination framework by lifting the inclination framework on one side with a lifting means, or by moving different lifting members of the lifting means to lift the lifting framework between the ship and the storage or storage area into another height position.

11. Port arrangement according to claim 1, characterized in that, if needed, in different freight handling apertures of the ship mutually different lifting frameworks are operating, said frameworks being fixed in structure and traveling between a first freight space compartment of the freight space of the ship and a storage on shore and that all first-type freight units have been positioned on pallets for the entire shipment handling in the storages and with the lifting framework, and the ship transport.

12. Port arrangement according to claim 1, characterized in that the lifting framework provided with at least two superimposed loading planes includes vertical distances of said loading planes which are adjustable to be equal to a vertical distance of the freight planes of the ship's first freight space compartment to be loaded and unloaded.

13. Port arrangement according to claim 1, characterized in that the storage areas on shore have multistory storage buildings having floors for storing first-type freight units which are multistory, that when the first-type freight units have been placed on pallets or equivalent, the floors of the multistory storage buildings are composed of roller ways with a small fixed inclination for transferring freight units within the storage building with the aid of gravity, and that the inclination has been directed at a conveyor, or away from a conveyor with which the freight units are handled between the storage areas and the loading sites, preferably buffer storages at the loading sites.

14. Port arrangement according to claim 13, characterized in that the storages for storing first-type freight units are comprised of at least a first storage compartment intended for freight outgoing for ship transport and in which all floors have been inclined towards said conveyor, and of a second storage compartment intended for incoming freight from ship transport, and in which all floors have been inclined away from said conveyor, that the inclination directions in said storage compartments have been arranged to be parallel but in opposite directions, whereby transport between both of the storage compartments and the loading sites is carried out with one and the same conveyor, that for a combination of each first and second storage compartment, one buffer storage is provided, respectively, for each loading site, and that the storage areas or storages for storing second-type freight units are storage areas in separation from said storages intended for storing first-type freight units.

15. Port arrangement according to claim 1, characterized in that first-type freight units are placed in the lifting framework, at least three of said freight units being in parallel positioning locations spaced apart in transverse direction to the ship, and in addition, preferably at least two of said freight units spaced in succession in longitudinal direction to the ship, and the lifting framework comprising in vertical direction more than one loading plane with one loading plane on top of the other, whereby the , lifting framework is provided with at least three superimposed load-positioning locations, and that the superimposed load- positioning locations of the freight units in the lifting framework have been formed from an equivalent number of loading planes and the parallel positioning locations are formed from members restricting the movement of the freight units in transverse direction when needed, such as guides, partitions or equivalent, guiding in said longtitudinal direction.

16. Port arrangement according to claim 15, characterized in that in the lifting framework horizontal distances between loading lines of the freight units correspond to horizontal distances between loading lines in the ship, and vertical distances between the loading planes are equivalent to vertical distances of the loading lines of superimposed freight planes in the ship, so that with the lifting framework the freight units are transferred from the storage area to predetermined freight planes of the first freight space compartment, where the freight units are moved onto the freight planes, respectively, the freight units are unloaded from the predetermined freight planes of the ship directly, with the aid of the lifting framework using reverse operations, whereby filling-in or unloading of the lifting framework on shore and unloading and filling-in in the ship are accomplished with transfers in the direction of said loading lines.

17. Port arrangement according to claim 15, characterized in that the lifting framework comprises typically one loading plane, on which a plurality of first-type freight units can be placed at least in the transverse direction of the ship and preferably also a plurality of first freight units in the longitudinal direction of the ship, that freight units are moved with said lifting framework between the freight handling aperture of the ship and a storage or storage area on shore, and that when loading the ship, the freight units are moved with the lifting framework into a freight handling aperture of the ship and further, to predetermined freight plane or predetermined freight planes where the freight units are moved using transfers in the direction of the first freight space compartment and loading lines of the lifting framework onto the freight plane of the ship, and that unloading the freight units from the ship is performed using reverse operations.

18. Port arrangement according to claim 1 wherein the freight space of the ship comprises further a second freight space compartment forming a structural part of the ship for said second-type freight units, characterized in also including transfer means for transporting second-type freight units from a storage area on shore into the second freight space compartment of the ship said transfer means having been positioned to act mainly outside of a coverage surface formed by the passage of the apparatus used for transferring first-type freight units, and formed preferably from container cranes for moving containers and large-size pallets and from another conveyor for bulk goods, whereby both first-type and second-type freight units can be loaded on board the ship simultaneously, and respectively, unloaded simultaneously as first-type freight units.

* * * * *

UNITED STATES PATENT AND TRADEMARK OFFICE
CERTIFICATE OF CORRECTION

PATENT NO. : 5,882,164
DATED : March 16, 1999
INVENTOR(S) : Rapeli

It is certified that error appears in the above-identified patent and that said Letters Patent is hereby corrected as shown below:

Column 3, line 40, change "tQ" to --to--.

Column 3, line 62, change "using which at least" to --using at least--.

Column 7, line 32, change "displaceble" to --displaceable--.

Column 8, line 55, change "simultaneusly" to --simultaneously--.

Column 9, line 42, change "a hundred of cars" to --a hundred cars--.

Column 11, line 1, change "the D loading" to --the loading--.

Column 11, line 37, change "In FIG. 11. six" to --In FIG. 11, six--.

Column 13, line 30, change "in:lined" to --inclined--.

Column 14, line 3, change "present applied cation" to --present application--.

Column 15, line 17, change "indication" to --inclination--.

Column 15, line 32, change "the same is valid what" to --the same is valid as what--.

UNITED STATES PATENT AND TRADEMARK OFFICE
CERTIFICATE OF CORRECTION

PATENT NO. : 5,882,164
DATED : March 16, 1999
INVENTOR(S) : Rapeli

It is certified that error appears in the above-identified patent and that said Letters Patent is hereby corrected as shown below:

Column 18, line 35, change "between storage" to --between a storage--.

Column 18, line 46, change "than" to --that--.

Column 18, line 58, change "claim 4 characterized" to --claim 4, characterized--.

Column 19, line 6, change "storage freight 8 units" to --storage of freight units--.

Column 19, line 16, change "to total" to --to the total--.

Column 19, line 24, change "cargo" to --freight units--.

Column 19, line 31, change "framework in" to --framework, in--.

Column 19, line 63, change "tile" to --the--.

Column 20, lines 27-28, change "units which are multistory, that" to --units, that--.

Signed and Sealed this

Twenty-sixth Day of December, 2000

Attest:

Q. TODD DICKINSON

*Attesting Officer*  *Director of Patents and Trademarks*